United States Patent [19]

Date et al.

[11] 4,178,086
[45] Dec. 11, 1979

[54] CAMERA WITH A DEVICE FOR PROTECTING FILM AGAINST FOGGING

[75] Inventors: Nobuaki Date; Hiroshi Aizawa, both of Kawasaki; Masanori Uchidoi, Yokohama; Masami Shimizu, Tokyo; Yoshiyuki Takishima, Yokohama, all of Japan

[73] Assignee: Canon Kabushiki Kaisha, Tokyo, Japan

[21] Appl. No.: 892,421

[22] Filed: Mar. 31, 1978

[30] Foreign Application Priority Data

Apr. 8, 1977 [JP] Japan ................................. 52-40013

[51] Int. Cl.$^2$ ....................... G03B 19/12; G03B 1/18; G03B 9/08
[52] U.S. Cl. .................................. 354/152; 354/173; 354/214; 354/234; 354/258; 354/267; 354/60 R
[58] Field of Search ............... 354/152, 171, 173, 212, 354/214, 204, 205, 268, 234, 235, 258, 266, 267, 60 R, 256; 242/71.4, 71.5, 71.6

[56] References Cited

U.S. PATENT DOCUMENTS

| | | | |
|---|---|---|---|
| 3,774,514 | 11/1973 | Okamoto et al. | 354/204 X |
| 3,875,580 | 4/1975 | Watanabe et al. | 354/268 |
| 3,930,263 | 12/1975 | Urano | 354/268 |
| 3,947,858 | 3/1976 | Ishida | 354/268 |
| 3,950,770 | 4/1976 | Imura | 354/152 |
| 3,981,022 | 9/1976 | Iwashita et al. | 354/171 |
| 4,017,875 | 4/1977 | Yamamichi | 354/205 X |
| 4,024,553 | 5/1977 | Maitani et al. | 354/268 X |
| 4,034,390 | 7/1977 | Urano et al. | 354/268 X |
| 4,089,483 | 5/1978 | Hokkanji et al. | 354/214 X |

*Primary Examiner*—L. T. Hix
*Assistant Examiner*—William B. Perkey
*Attorney, Agent, or Firm*—Toren, McGeady and Stanger

[57] ABSTRACT

In the camera disclosed, an electromagnetic actuator is responsive to a timing pulse of short duration from an exposure control circuit for controlling the closing movement of a shutter. A permanent magnet may accidently be left latched and hold the rear curtain in cocked position after the timing pulse because of possible damage to an electromagnetic control circuit as a result of a battery short circuit. This may cause the film to fog during subsequent winding or rewinding. To prevent this, an indicator produces a visible indication either in the field of view of the camera finder or, in the case of remote shutter operation, outside the camera housing, that the rear curtain must be manually unlatched.

26 Claims, 4 Drawing Figures

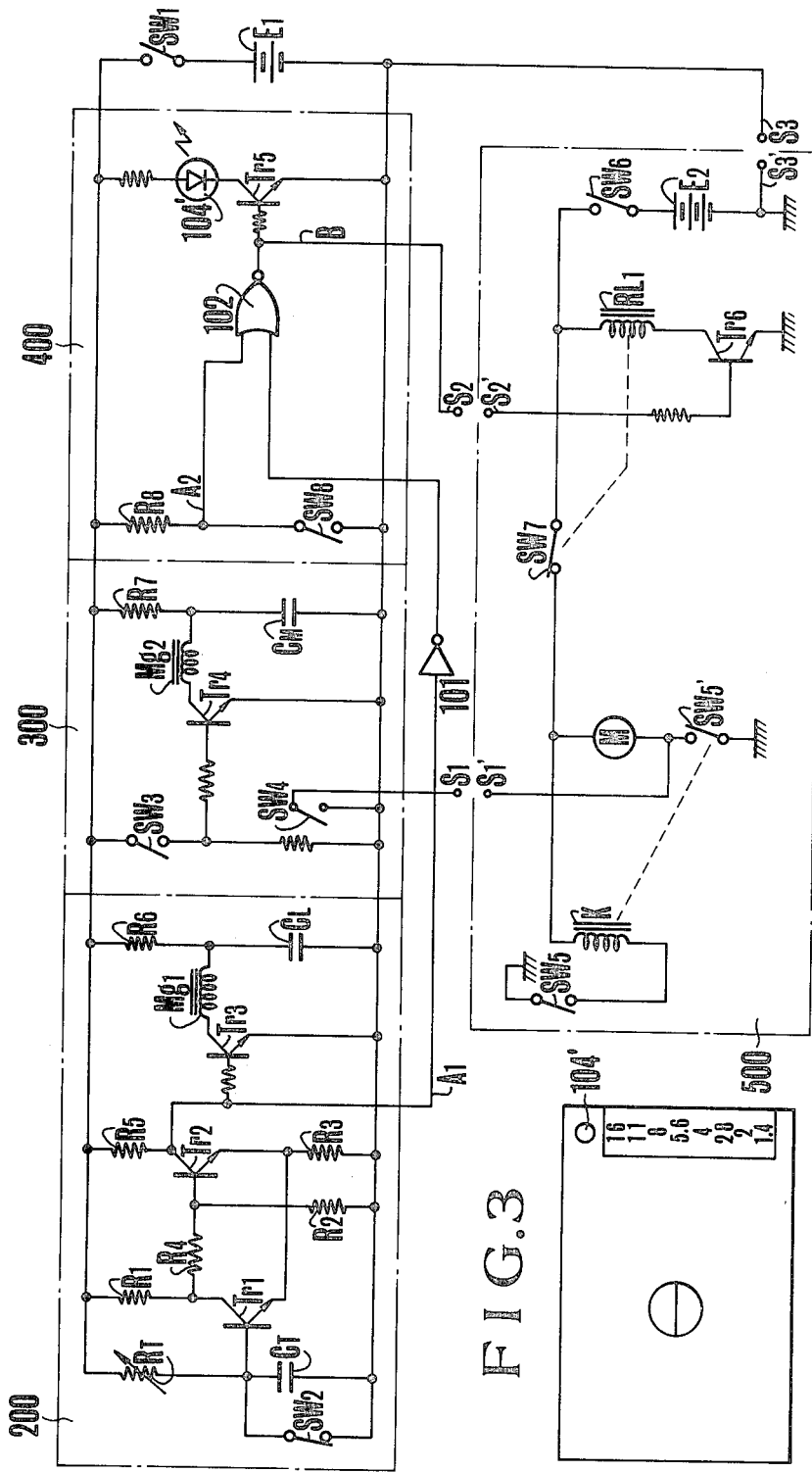
F I G. 2
F I G. 3

CAMERA WITH A DEVICE FOR PROTECTING FILM AGAINST FOGGING

BACKGROUND OF THE INVENTION

This invention relates to photographic cameras having an electromagnetically operated shutter, and more particularly to a device for protecting film in the camera against fogging that is adapted for use with a shutter control circuit in which an actuating pulse temporarily energizer a magnetic solenoid to control the closing movement of the shutter.

It is known to provide Prior Art various types of shutter control circuits including one in which the duration of an actuating pulse for energizing a magnetic solenoid is controlled in accordance with a preselected or computed shutter time. However, when the circuit is damaged and fails to produce an actuating pulse, or when the actuating pulse does not produce sufficient power to energize solenoid to retain the closing member of the shutter in cocked position the closing member follows the opening member and produces a blank or wasteful frame exposure; this situation can arise as a result of damages either to the solenoid which connects the circuit, output is or the cooperation of the solenoid with the armature because through the introduction of foreign particles into the space is interrupted or the circuit's between the solenoid and the armature battery supply is short circuited, or through a decline in the actual voltage of the battery, the closing member. It often happens, moreover, that the operator is not immediately aware of this fact.

Another type of shutter control circuit produces an actuating pulse of predetermined short duration that temporarily energizes the solenoid, to attract or repel the armature depending upon whether or not a permanent magnet is employed. When the shutter malfunctions from any one of the above-mentioned reasons, a fogged frame of film will result because the shutter will remain open after the actuating pulse is produced. Even if the operator is aware of faulty shutter operation, it is nevertheless likely that the operator will, in the future overlook closing the shutter as a necessary prelude to resetting the camera. With the shutter left open, and the film winding lever or rewinding crank is operated, the fresh or exposed area of the film will be fogged. This is particularly serious if the camera is operated by means of a motor drive unit.

To improve the reliability of the camera drive control, be it manual or automatic, it is necessary that (1) the operator is warned through a visible signal that something is wrong, (2) the film winding and rewinding mechanism is automatically hindered from further movement in response to any one of the above mentioned malfunctions; and (3) the closing member of the shutter can be disconnected from the latching connection through an operating member that is accessible from the outside of the camera housing, and actuating the closing member release monitor the operator to wind or rewind the film.

SUMMARY OF THE INVENTION

Accordingly, it is an object of the present invention to provide a highly reliable camera in which an actuating pulse temporarily energizes a solenoid that controls the closing movement of the shutter.

It is another object of the invention to provide a highly reliable camera that has a device for preventing actuation of the film winding and rewinding mechanism during exposure operation until the closing member is manually released from latching connection when an electrical control device for producing an actuating pulse or the solenoid is damaged. According to this object those frame areas of the film which are to be exposed or which were wound up are protected against fogging during the winding or rewinding processes, respectively.

Still another object is to provide a camera with an indicator that enables the operator, upon production of a visible signal, to be immediately conscious of the fact that the shutter has been subjected to faulty operation. For the purpose of remote operation of the shutter, this indicator must be visible from the outside of the camera housing. Otherwise, this indicator may be positioned in the field of view of the camera finder.

In one embodiment of the invention applied to a single lens reflex camera, a device for protecting film in the camera against fogging comprises a first detent lever that is arranged upon closing movement of the shutter to enable the operator to perform one cycle of film winding and shutter cocking operation. A second detent lever is arranged upon return movement of the reflex mirror to enable the operator to take the film out of positive connection with the film winding mechanism, as a sprocket that engages the perforations is freed from a driving shaft. A manually operable actuator also is provided which, when depressed after the opening movement of the shutter, effects a closing movement of the shutter with the simultaneous return movement of the mirror.

In response to a time lag between the production of the actuating pulse that temporarily energizes the electromagnet and the movement of the latch that releases the rear curtain, a control circuit produces a signal that activates a light-emitting diode as the indicator. This signal may be utilized in controlling the electrical power supply for an electric motor which has an output member coupled through an electromagnetic clutch to the film winding mechanism in the camera. Operation of the clutch, moreover, is controlled through a switch that is arranged to cooperate with the first detent lever.

These and other objects and features of the present invention will become apparent from the following detailed description taken in conjunction with the accompanying drawings in which:

BRIEF DESCRIPTION OF THE DRAWINGS

FIG. 2 is a schematic electrical circuit diagram of the motor driven camera of FIG. 1.

FIG. 3 is a plan view of a finder of the camera, showing an example of the location of the indicator in FIGS. 1 and 2.

DESCRIPTION OF THE PREFERRED EMBODIMENTS

Figure 1:
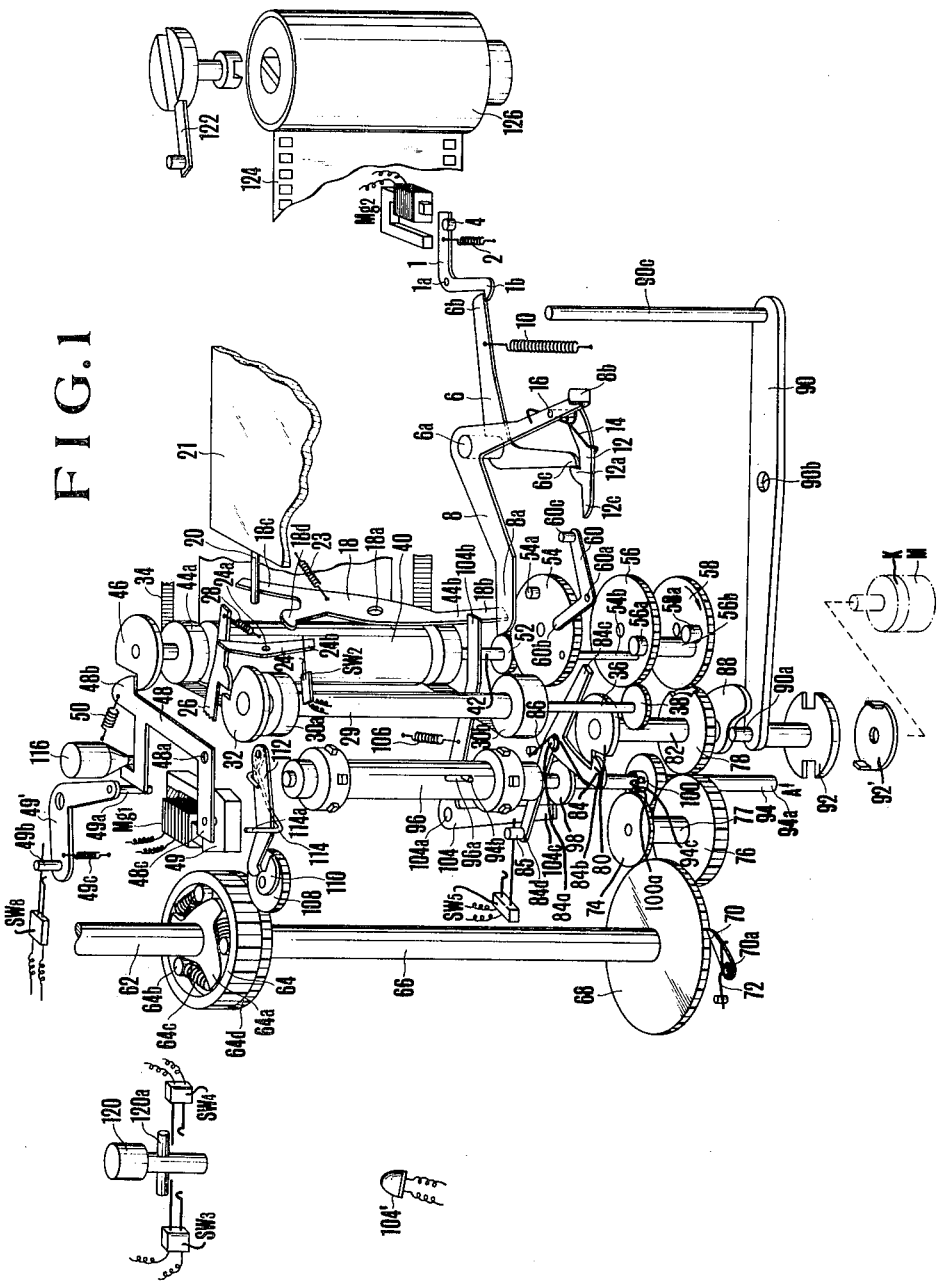
FIG. 1 is an exploded perspective view of one embodiment of a protective device according to the present invention applied to a single lens reflex camera, showing part of the shutter and associated mechanisms of the camera and part of a motor drive unit attached to the camera, the parts being shown in cocked position.

Referring to FIGS. 1, 2 and 3, there is shown one embodiment of a protective device according to the present invention applied to a single lens reflex camera with a motor drive unit demountably attached to the camera body. In FIG. 1, the camera body is equipped with a focal plane shutter having a front and a rear curtain. On the upper and lower sides of left border of the front curtain (not shown), there are tapes 34, the ends of which, after being trained around idlers 44a, are wound on two wind-up drums 30a and 30b which are fastened on a common shaft 29, when the shutter is cocked, thus tensioning a spring which is placed in a wind-off drum (not shown) therefor. The front curtain is held in the cocked or framing aperture closed position by a first latch or lever 26 the nose on the lever 26 engages a notch in a cam disk 32 under the action of a return spring 28. The cam disk 32 is fixed to the top of the shaft 29. The opposite end of the shaft 29 is elongated in a smaller diameter portion 36. A pinion 38, which constitutes part of a shutter cocking mechanism, infixed to the end of the matter diameter portion 36.

The mechanism further includes a master gear 58 rotatably mounted on a shaft (not shown). The master gear 58 is arranged to mesh with a drive gear 78, the latter constituting part of a film winding mechanism, during the winding process. At the terminal end of the winding process, the gear 78 takes an angular position in which a circumferential cutout is aligned with the master gear 58. In this manner, the master gear 58 is permitted to turn under the influence of a spring (not shown) in a reverse direction in order to position a torque transmitting member or pin 58a beyond the range of movement of a paired pin 56b which extends downwardly from the lower surface of a first control gear 56. As shown in FIG. 1, the first control gear 56 meshing with the pinion 38.

A reset bar or pin 56a is eccentrically mounted on the upper surface of the gear 56 and extends into the path of movement of an elongated pin 54b which extends downwardly from the lower surface of a second control gear 54 which is rotatably mounted on a common shaft for the master and first gears 58 and 56. The gear 54 meshes with a pinion 52 that is fixed to the bottom end of a shaft 42 of a wind-up drum 40. The rear curtain (not shown) is wound on the drum 40 when the shutter is set, thus tensioning a spring which is placed in a wind-off drum also (not shown).

When the front curtain is held in the aperture closed position by the first latch lever 26, the reset bar 56a engages the elongated pin 54b and therefore to maintain the rear curtain in framing aperture open position against the force of the drive spring in the wind-off drum. This occurs regardless of whether or not the latching action on the rear curtain is established, because of the creation of a gap between a second latch lever 48 in active position and a cam disk 46 which is secured to the top end of the shaft 42 of the windup drum 40 for the purpose to be described later. The second latch lever 48 pivots about a pin 48a and is provided with an electromagnetic actuating device.

This electromagnetic actuating device comprises a permanently magnetized armature 49 that is carried on the opposite arm 48c of the second latch lever 48. Upon temporary energization of a solenoid Mg1, a nose 48b engages a cam notch an the disk 46. As shown, the magnetic winding or solenoid Mg1 this a core positioned adjacent to the armature 49 in order to permit counter-clockwise movement of the lever 48 about the pivot pin 48a in response to temporary solenoid energization. This movement occurs under the action of a bias spring 50 which prevents the lever nose 48b from holding the rear curtain in the aperture open position. Then, of course all is provided that an actuating pulse applied to the solenoid Mg1 from the electronic control device that is illustrated in FIG. 2 is of sufficient magnitude to overcome the magnetic strength of the permanently magnetized armature 49.

When a shutter release button 120 (FIG. 1) is depressed to close a normally open switch SW3, a transistor Tr4 (FIG. 2) in block 300 is rendered conducting, causing a transient current to flow through a second magnetic winding Mg2 from a storage capacitor CM. Such temporary energization of the magnetic winding Mg2 attracts an actuating lever 1 (FIG. 1) for the camera release against the force of a bias spring 2. As the lever 1 is turned about a pivot pin 1a, the lever pawl 1b is disengaged from a drive lever 6 at one arm end 6b. A drive spring 10 urges the lever 6 to rotate in a clockwise direction about a pivot shaft 6a. This motion of the drive lever 6 is transmitted through a diaphragm return motion of the control lever 12 to a diaphragm closing down lever 8. This diaphragm closing down lever 8 in turn is transmitted to a mirror drive lever 18 by way of a lever arm 8a-and-arm 18b connection. As the opposite arm 18c of the lever 18 bears against a rod 20 extending from a support frame (not shown) for a mirror 21, when the mirror 21 has flipped up out of way, an actuating lever 24 is struck on one end by a projection 18d of the mirror drive lever 18. In this manner the front curtain is released from latching connection with the first latch lever 26 and at the same time a normally closed switch SW2 is opened. The front curtain starts to run down while being wound on the wind-off drum under the action of the drive spring therein. Simultaneously the reset bar 56a moves away from the elongated pin 54b so that the second latch lever 48 will hold the rear curtain in the aperture open position.

Referring to FIG. 2, with the switch SW2 opened, a timing capacitor CT charges through a variable resistor RT. The resistance of the resistor RT is related to the preset shutter time value and the capacitor CT continues to charge for a corresponding time interval. The base electrode of a first transistor Tr1 is connected to the output of the timing circuit RT and CT. At the termination of the charging time interval the transistor Tr1 is rendered conducting in turn, renders a second transistor Tr2 nonconducting. It is to be noted here that the first and second transistors Tr1 and Tr2 together with five resistors R1 through R5 constitute a Schmitt type trigger circuit.

The collector of the second transistor Tr2 is connected through a resistor to a base electrode of a third transistor Tr3. The emitter electrode of the transistor Tr3 is connected to ground. The collector electrode of the transistor Tr3, however, is connected to one end of the winding of the solenoid Mg1. The opposite end of the winding for the solenoid Mg1 is coupled between a resistor R6 and a capacitor CL. The capacitor CL was previously charged through the resistor R6 from a battery E1, when a main switch SW1 and switches SW3 and SW4 were closed by the depression of the shutter button 120 (FIG. 1). Responsive to the output of the Schmitt type circuit, the third transistor Tr3 allows a transient current to be drawn suddenly from the storage capacitor CL through the winding Mg1.

Referring again to FIG. 1, when the magnetic winding Mg1 is energized to cancel the magnetic flux of the permanently magnetized armature 49, the second latch lever 48 is turned about pivot pin 48a in a counter-clockwise direction under the action of spring 50. This movement of the lever 48 causes the nose 48b to disengage the cam disk 46. The counter-clockwise movement of the lever 48 also causes 49 to turn in a clockwise direction in response to the a lever engagement of a pin 49a with one arm of the lever 48. This clockwise rotation of the lever 49', moreover, is against the force of a bias spring 49c. Such movement of the lever 49' causes a pin 49b that extends upwardly from the opposite arm of lever 49 to that on which the pin 49a is mounted a switch SW8. This switch SW8 constitutes part of an indicator control circuit which is shown within a dashed line block 400 in FIG. 2 and which will be described later.

At the terminal end of closing movement of the rear curtain, a pin 54a on the upper surface of the gear 54 bears against an arm 60b of a diaphragm and mirror reset control lever 60. A pin 60c on the head of the lever 60 in turn engages the free end of the diaphragm return control lever 12. This contact causes the lever 12 to be disengaged from the drive lever 6, as the lever 12 is turned in a counter-clockwise direction against the force of a bias hair spring 14. This motion causes the drive lever 8 turn counter-clockwise to the illustrated position, while being followed up by the mirror device lever 18 under the action of a return spring 23.

At the same time as the diaphragm and mirror are being reset, a first detent lever 84 is turned about a pivot pin 84a in a clockwise direction against the force of a hair spring 86. One arm 84c of the first detent lever 84 bears against the elongated pin 54b until a pawl 84b is retracted from the path of movement of a protrusion on a cam disk 80 to enable the operator to perform a film winding operation.

A film winding mechanism includes an operating member known as a winding lever (not shown), secured to one end of a drive shaft 62. The opposite end of the drive shaft 62 is fixed to a hub 64a. As shown in FIG. 1, the hub 64a has three recessed pockets which receive respective rollers 64b. These rollers are constrained by means of springs 64c which are portioned within a sleeve 64d in order to constitute a one-way clutch 64. A driven shaft 66 is secured to one end of the sleeve 64d and the opposite end of the shaft 66 is fixed to a gear 68. Although not shown in the drawing, the gear is drivingly connected to a take-up reel through suitable clutch means (also not shown). A pawl lever 70 which pivots about a pin 70a engages the gear 68 under the action of a hair-spring 72 to prevent reverse rotation of the gear 68. A small gear 74 meshes with the gear 68. A large gear 76 which is fixed to a common shaft 77 with the gear 74 meshes with the drive gear 78 and with another gear 100 which constitutes part of a film transport mechanism.

This mechanism further includes a sprocket 96 having teeth which engage perforations of the film 124. A release plunger 94 also forms a part of the film transport mechanism. No plunger 94 is driven by the gear 100 through clutch means and in order to drive the sprocket 96. One end of the plunger 94 forms a release button 94a which is accessible at the bottom portion of the camera housing. The clutch means, moreover, is constructed from a pin 94c which extends radially from the plunger 94 into one of a number of longitudinally elongated detent slots 100a that are formed in a hub member of the gear 100. To permit longitudinal movement of plunger 94, there is provided a slot 96a in the sprocket 96. The slot 96a receiver a pin 94b which extending from the plunger 94. A spring in not shown sprocket 96 tends to restore plunger 94 to its fully protruding position as illustrated in FIG. 1. When the release plunger 94 is urged or depressed in an upward direction, as indicated by an arrow As to disengage the pin 94c from one of the detent slots 100a, the film 124 can be transported in the opposite direction to that from which it was advanced for exposure purposes by operating a crank lever 122. In this manner the film is rewound on a supply reel in a cartridge 126.

In order to prevent the plunger 94 from being depressed when the shutter is accidentally opened, according to the invention, there is provided a second detent lever 104 having two arms 104b and 104c and pivoted at 104a. The arm 104b normally is in abutting engagement with lever arm 18b of the mirror drive lever 18 under the action of a bias spring 106.

The arm 104c cooperates with a collar 98 on the release plunger 94 in the following. When the shutter is actuated to be opened, the arm 104b follows the mirror drive lever 18 and the other arm 104c enters a space just above the radial flange of the collar 98. This relationship between the arm 104c and the collar 98 holds the plunger 94 in its fully protruding position.

Assume the shutter time control circuit 200 and magnetic winding Mg1 are damaged through short circuiting the battery E1, or through a decline in the voltage of battery E1 below a satisfactory operating level, or through a malfunction in the electromagnetic actuating device because of foreign particles in its spaces between the moving parts, then the shutter will not be actuated and close after the termination of an otherwise proper film exposure. In these circumstances the device that characterizes the invention insures that the operator will not be able to perform the next cycle of the winding operation. Thus, the first detent lever 84 remains effective to maintain the film winding mechanism stationary. The film rewinding operation can be accomplished, however, because the second detent lever 104 is effective to keep the film transport mechanism in locked relation with the stationary film winding mechanism. Consequently, those frame areas of the film which are to be exposed, or which after having been exposed are wound on the take-up reel are protected against fogging, except for that frame area which experienced faulty shutter operation.

When the operator, looking through the finder, is made conscious by a visual signal 104' (FIG. 3) of the fact that the electromagnetic actuating device is malfunctioning, a reset button 116 can be depressed to manually actuate the rear curtain release. This reset button 116 is accessible at the top of the camera housing and is provided with a tapered portion at its bottom end to act, upon depression, on the second latch lever 48. This action, depressing the reset button, turns the second latch lever 48 counter-clockwise against the attractive force of the permanent magnet 49 to the core of the solenoid Mg1. It is to be noted that so long as the front curtain is held in the cocked position, the accidental depression of button 116 does not lead to actuation of release of the rear curtain. If the force depressing the reset button 116 is released, the entry of latch nose 48b into the cam notch 46 assured because of the between the tapered portion of the reset button 116 and the second latch lever 48 gap.

Referring again to FIG. 2, the indicator or display control circuit 400 comprises a NOR gate 102 having a first input conductor A1 connected to the output of the Schmitt trigger circuit in block 200. The circuit from the Schmitt trigger to the Norgate 102 by way of the first input conductor A1 includes a signal inverter 101 second input conductor A2 is connected between a resistor R8 and the switch SW8. The switch SW8 is arranged to be opened by lever 49' (FIG. 1) when the closing movement of the shutter is effected. A transistor Tr5 has its base electrode connected to the output terminal of the NOR gate 102. The emitter electrode of the transistor TR5 is connected to ground and the collector electrode of this transistor is connected to the indicator or light-emitting diode 104.

In operation, the output of the Schmitt trigger circuit changes from a binary "0" to a binary "1" signal level in order to produce an actuating pulse. This output signal from the trigger circuit, after being inverted to "0" level by signal the inverter 101 is coupled to the NOR gate 102. If this inverted actuating pulse does not temporarily energizes the magnetic winding Mg1 sufficiently to repel to the armature 49 (FIG. 1) away from the core of the magnetic winding Mg1, the switch SW8 will remain closed and produce a "0" signal in the second input conductor A2 level. Responsive to these two signals at the same level, that is, the "0" level, NOR gate 102 produces a "1" signal level at its output terminal. This "1" level signal then is applied to the base electrode of the transistor TR5 in order to render render this transistor conducting and thereby to energize the light-emitting diode 104.

This output from the NOR gate 102 also is applied by way of a conductor B through a terminal S2 and terminal S2' connection to the base electrode of a switching transistor Tr6 in a dot-and-dash line motor drive unit block 500. With the "1" signal level from the NOR gate 102 applied to its ban electrode the transistor Tr6 is rendered conducting and energizes a relay RL1. Energization of relay RL1 causes a normally closed switch SW7 to open in order to disconnect the winding of an electric motor M from an electrical power source E2.

The motor control circuit 500 further includes a magnetic winding K for an electromagnetic clutch (FIG. 1). A second power supply control switch SW5 for the winding K closes when the first detent lever 84 disengaged from its latching connection with the film winding mechanism. In this situation, the elongated pin 54b pushes the lever arm 84c to the left, as viewed in the drawing. A third power supply control switch SW5' (FIG. 2) that is electrically connected between one end of the motor winding M and the common ground is closed when the electromagnetic clutch winding K is rendered effective to transmit the motion of energized motor M to film winding mechanism. This motion is transmitted through an adapter piece 92' (FIG. 1) which engages a coupler 92, the latter being mounted in the camera body.

A fourth power supply control switch SW4 for the motor M is provided in the camera body to cooperate with the shutter release button 120 (FIG. 1). This switch SW4 is connected through a terminal S1 and terminal S1' to establish a parallel circuit with the third switch SW5'. Thus, when shutter button 120 (FIG. 1) is depressed the circuit to ground for the motor M is complete through the switch SW4. Consequently, the motor M starts to rotate and the motor rotation continues after the switch SW4 is opened and until the switch SW5' also is opened.

During each cycle of winding operation, a cam disk 88 (FIG. 1) rotates one revolution along with the common shaft 82 of the drive gear 78. A coupler 92 also rotates during a winding operation cycle while a charge lever 90 is driven to swing about a pivot pin 90b in response to the sliding engagement between a cam follower pin 90a and the camming surface of the cam disk 88.

In the first half cycle of operation of the charge lever 90, the drive lever 6 is turned in a counter-clockwise direction against the force of the drive spring 10 until the arm ends 6b and 6c are engaged with the respective pawls 1b and 12a. As master gear 58 is driven by gear 78 in a clockwise direction the pin 58a on the master gear 58 engages the first reset bar 56b. Following this, the pin 56a on the first control gear 56 engages the elongated pin 54b, and then both of the gears 56 and 54 are turned back to move the front and rear shutter curtains to their normal pre-exposure positions.

In these pre-exposure positions, the curtains are held by the action of first and second latch levers 26 and 48 on cam disks 32 and 46 respectively, because the second latch lever 48 is set in the illustrated position by a reset lever 112. A hair spring 114 tends to restore the lever 112 to an abutting engagement at its free end with the camming surface of a cam 110 that is fixed to a gear 108. The gear 108 meshes with a gear that is formed on the outer peripheral surface of the clutch sleeve 64d. Each cycle of operation of the film winding mechanism causes one revolution of gear 108 and cam 110 which moves the armature 49 into engagement with a resilient member or bent portion 114a of the spring 114. This engagement presses the permanently magnetized armature 49 toward the core of the magnetic winding Mg1, and then draws the bent portion 114a away from the armature 49 as the reset lever 112 is allowed to turn in a counter-clockwise direction. When the winding operation nears the terminal end of movement of the cam disk 80, the first detent lever 84 suddenly turns in a counter-clockwise direction because the pawl 84b drops into the bottom of the cam notch in the disk 80. In this manner, the switch SW5 is opened in order to terminate the energization of the electromagnetic clutch K which in turn causes the switch SW5' to open and stop the motor M.

Figure 4:
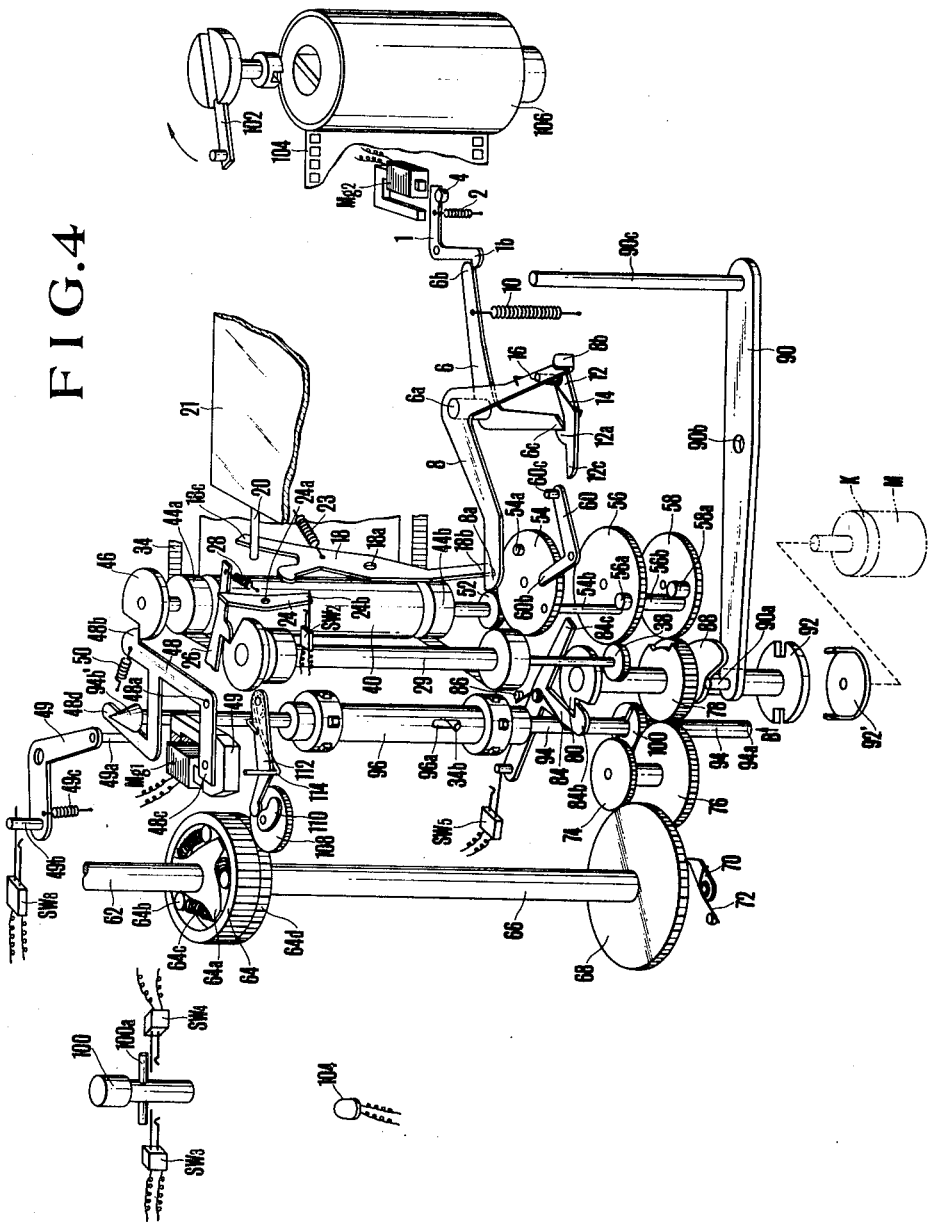
FIG. 4 is an exploded perspective view of another embodiment of the invention.

FIG. 4 shows another embodiment of the invention which is different from the above mentioned embodiment in that the release plunger 94 is modified to provide a similar function to that of the manually operable actuator 116 that is shown in FIG. 1. This enables the second detent lever 104 in the FIG. 1 embodiment of the invention and its associated parts to be omitted. As shown in FIG. 4, the release plunger 94 is elongated upward and terminates in a right cone 94b'. This right cone 94b' is arranged adjacent to one arm 48d of the second latch lever 48 so that when plunger 94 is depressed upward, the second latch lever 48 is turned in a counter-clockwise direction with the resulting position of the pawl 48b being fully retracted from the cam notch in the cam disk 46.

What is claimed is:

1. A safety device for a camera comprising:
  (a) a camera body having a shutter including a front curtain and a rear curtain for controlling the amount of exposure of a film;
  (b) shutter time control means for producing a shutter rear curtain closing signal to control the time of closure of the shutter based on a set shutter time or a computed shutter time;

(c) shutter rear curtain holding and releasing means having an electromagnetic device whose energization is controlled by said shutter rear curtain closing signal, for holding or releasing said shutter rear curtain in response to an attracting or releasing operation of said electromagnetic device;

(d) shutter rear curtain movement detecting means for detecting whether said shutter rear curtain runs down to produce a detection signal when said rear shutter curtain runs down;

(e) film winding means for winding the film and having an operating member accessible from outside the camera and a film take-up reel on which the film is wound, said take-up reel being connected to be driven by operation of said operating member;

(f) hindering means for hindering film winding operation and having a detent member engageable with said film winding means and said shutter rear curtain movement detecting means, and arranged so that when said shutter is cocked said detent member engages said film winding means to hinder the film winding up operation and when said shutter rear curtain movement detecting means produces said detection signal, said film winding means is disengaged from said detent member; and (g) film winding detention release means having an operating member accessible from the outside of the camera for actuating said shutter rear curtain holding and releasing means, so that said rear curtain is released from the held position by operation of said operating member and said film winding means is released from said detent member by the detection signal of said shutter rear curtain movement detecting means.

2. A safety device according to claim 1, wherein said shutter rear curtain holding and releasing means form an actuating signal, and further including:

(a) film winding detention warning means having:
  (i) a logic circuit receptive of the output signal of said shutter time control means and the actuating signal of said shutter rear curtain holding and releasing means for detecting opening and closing states of said shutter rear curtain; and
  (ii) warning display means having light-emitting means responsive to the output signal of said logic circuit for producing light dependent upon the opening and closing states of said shutter.

3. A safety device according to claim 2, wherein said light-emitting means is positioned to be visible in the field of view of the camera finder.

4. A safety device according to claim 2, wherein said light-emitting means is positioned to be visible from the outside of the camera.

5. A device as in claim 2, wherein said rear curtain holding and actuating means includes a switch responsive to said electromagnetic device and coupled to the logic circuit, said switch forming the actuating signal.

6. A safety device for a camera comprising:
(a) a camera body having a shutter for controlling the exposure of a film;
(b) shutter time control means for controlling the period of opening of said shutter based on a set shutter time or a computed shutter time;
(c) shutter opening control means having an electromagnetic device whose energization is controlled by the output signal of said shutter time control means, for controlling the opening of said shutter by an attracting or releasing operation of said electromagnetic device;

(d) shutter closing detecting means for detecting whether said shutter is closed to produce a detection signal;

(e) film winding means having an operating member accessible from the outside of the camera and a film take-up reel on which the film is wound, said operating member being drivingly connected to the film take-up reel;

(f) film winding up operation hindering means having a detent member engageable with said film winding up means and said shutter closure detecting means, and arranged so that when said shutter is cocked, said detent member engages said film winding means to hinder the film winding up operation and when said shutter closure detecting means produces said detection signal, said film winding means is released from said detent member; and (g) film winding detention release means having an operating member accessible from the outside of the camera for actuating said shutter opening control means, so that said shutter is closed by operation of said operating member and said film winding up means is released from said detent member by the detection signal of said shutter closure detecting means.

7. A safety device for a camera comprising:
(a) a camera body having a shutter which includes a front curtain and a rear curtain for controlling the amount of exposure of a film and having a mirror movable between a viewing position where an image forming light beam is blocked and a non-viewing position where said light beam reaches said film;

(b) shutter time control means for producing a shutter rear curtain closing signal to control the time of closure of the shutter based on a set shutter time or a computed shutter time;

(c) release means responsive to a picture-taking operation of the camera for performing releasing operation;

(d) mirror drive means responsive to said releasing operation of said releas means for moving said mirror from said viewing to said non-viewing position and having bias means for returning said mirror from said non-viewing to said viewing position;

(e) shutter rear curtain holding and releasing means having an electromagnetic device whose energization is controlled by said shutter rear curtain closing signal, and arranged so that said shutter rear curtain is held or released in response to attractive or releasing operation of said electromagnetic device;

(f) shutter rear curtain movement detecting means for detecting whether said shutter rear curtain runs down and to produce a detection signal when said shutter rear curtain runs down;

(g) mirror return control means responsive to said detection signal for returning said mirror drive means and said mirror to the viewing position;

(h) film winding means having an operating member accessible form the outside of the camera and drivingly connected to a film sprocket;

(i) film rewinding means having clutch means arranged upon operation to release said film sprocket from said film winding means and having an operating member accessible from the outside of the camera for rewinding said film;

(j) film rewinding operation hindering means having a detent member movable in engagement with said mirror drive member to a position where said clutch means is effective when said mirror is in the non-viewing position and to a position where said clutch means is ineffective when said mirror is in the viewing position; and (k) film rewinding detention release means having an operating member accessible from the outside of the camera for actuating said shutter rear curtain holding and releasing means, and arranged upon operation to release said shutter rear curtain from the held position and also to actuate said mirror drive member by said return control means, so that said film rewinding operation hindering member is moved to a position where said clutch means is releasable.

8. A safety device according to claim 7, wherein said shutter rear curtain holding and releasing means forms an actuating signal, and further including:

(a) film rewinding detention warning means having:
 (i) a logic circuit receptive to the output signal of said shutter time control means and the actuation signal of said shutter rear curtain holding and releasing means for detecting opening and closing states of said shutter rear curtain; and
 (ii) warning display means having light-emitting means responsive to the output signal of said logic circuit for producing light in response to the opening and closing states of said shutter.

9. A safety device according to claim 8, wherein said light-emitting means is constructed to be visible in the field of view of the camera finder.

10. A safety device according to claim 8, wherein said light-emitting means is positioned to be visible from the outside of the camera.

11. A device as in claim 8, wherein said rear curtain holding and actuating means includes a switch responsive to said electromagnetic device and coupled to the logic circuit, said switch forming the actuating signal.

12. A combination of an automatic winding device and a safety device for a camera comprising:

(A) said automatic winding device having drive torque generating means and a drive torque transmitting mechanism for transmitting a drive torque to a camera body in an intermittent manner based on a signal from either of said camera body and said winding device; and (B) a camera to which said automatic winding device is attachable having:
 (a) a shutter having a front curtain and a rear curtain controlling the amount of exposure of a film;
 (b) shutter time control means for producing a shutter rear curtain closing signal to control the time of closure of the shutter based on a set shutter time or a computed shutter time;
 (c) shutter rear curtain holding and releasing means having an electromagnetic device whose energization is controlled by said shutter rear curtain closing signal and arranged so that said shutter rear curtain is held or released in response to an attracting or releasing operation of said electromagnetic device;
 (d) shutter rear curtain movement detecting means for detecting if said shutter rear curtain runs down to produce a detection signal;
 (e) film winding means having coupling means connected to said drive torque transmitting mechanism of said automatic winding device, a spool shaft on which the film is wound, and transmitting means for transmitting drive torque from said coupling means to said spool shaft;
 (f) film winding operation hindering means having a detent member engageable with said film winding means and said shutter rear curtain movement detecting means, said hindering means being arranged so that when said shutter is cocked, said detent member engages said film winding means to hinder the film winding operation and when said shutter rear curtain movement detecting means produces said detection signal, said film winding means is released from said detent member;
 (g) a film winding operation hindering detection means having a first switching means arranged to be opened and closed dependent upon movement of said film winding operation hindering means, so that the power supply to said drive torque generating means of said automatic winding device is controlled by the opening and closing operation of said switching means to cut off drive torque of said film winding means;
 (h) film winding detention release means having an operating member accessible from the outside of the camera for actuating said shutter rear curtain holding and releasing means, so that said rear curtain is released from the held position by operation of said operating member and said film winding means is released from said detent member by the detection signal of said shutter rear curtain movement detecting means; and
 (i) warning means having light-emitting means responsive to the output signals of said shutter time control circuit and said shutter rear curtain holding and releasing means for producing light for warning the opening and closing states of the shutter.

13. A camera according to claim 12, wherein said light-emitting means is constructed to be visible in the field of view of the camera finder.

14. A device as in claim 12, wherein said rear curtain holding and actuating means includes a switch for producing an output signal and actuating said warning means.

15. A safety device for a camera comprising:
(a) a camera body having a shutter comprised of a front curtain and a rear curtain controlling the amount of exposure of a film;
(b) shutter time control means for producing a shutter rear curtain closing signal to control the time of closure of the shutter based on set shutter time or a computed shutter time;
(c) shutter rear curtain holding and releasing means having an electromagnetic device whose energization is controlled by said shutter rear curtain closing signal and arranged so that said shutter rear curtain is held or released in response to an attracting or releasing operation of said electromagnetic device;
(d) shutter rear curtain movement detecting means for detecting if said shutter rear curtain runs down to produce a detection signal;
(e) film winding means having winding force transmitting means for transmitting film winding force from outside of the camera and a spool shaft which is rotated by the driving force of said transmitting means to wind up the film;

(f) clutch means arranged between said spool shaft and said transmitting means upon operation from the outside of the camera to release said spool shaft from operative connection with said transmitting means;

(g) film winding operation hindering means having a detent member engageable with said film winding means and said shutter rear curtain movement detecting means, whereby when said shutter is cocked said detent member engages said film winding means to hinder film winding operation and when said shutter rear curtain movement detecting means produces said detection signal, said film winding means is released from said detent member; and (h) film winding detention release means having actuating means responsive to disengagement of said clutch means from said spool shaft for actuating said shutter rear curtain holding and releasing means to that said rear curtain is released from the held position by operation of said actuating means and said film winding means is released from said detent member by the detection signal of said shutter rear curtain movement detecting means.

16. A camera according to claim 15, wherein said shutter rear curtain holding and releasing means form an actuating signal, and further including a warning means having:

(i) a logic circuit receptive of the output signal of said shutter time control means and the actuating signal of said shutter rear curtain holding and releasing means for detecting opening and closing states of said shutter; and (ii) light emitting display means having light-emitting means responsive to the output of said logic circuit for producing light dependent upon the opening and closing states of said shutter.

17. A camera according to claim 16, wherein said light-emitting means is arranged to be visible from the outside of the camera.

18. A device as in claim 16, wherein said rear curtain holding and actuating means includes a switch responsive to said electromagnetic device and coupled to the logic circuit, said switch forming the actuating signal.

19. A safety device for a camera comprising:

(a) a camera body having a shutter which includes a front curtain and a rear curtain controlling an amount of film exposure and having a mirror movable between a viewing position and a non-viewing position;

(b) shutter time control means for producing a shutter rear curtain closing signal to control the time of closure of the shutter based on set and computed shutter times;

(c) release means responsive to photo-taking operation of the camera for performing releasing operation;

(d) mirror actuating means responsive to said releasing operation of said release means for moving said mirror from said viewing to said non-viewing position and having bias means for returning said mirror from said non-viewing to said viewing position;

(e) shutter rear curtain holding and releasing means having an electromagnetic element whose energization is controlled by said shutter rear curtain closing signal and arranged so that said shutter rear curtain is held and released in response to an attracting and releasing operation of said electromagnetic element;

(f) shutter rear curtain movement detecting means for detecting if said shutter rear curtain runs down to produce a detection signal;

(g) mirror return control means responsive to said detection signal for returning said mirror actuating means and said mirror to the viewing position;

(h) film winding up means having an operating member accessible from the outside of the camera, having torque transmitting means for transmitting torque of said operating member and having a spool shaft which is rotated in connection with said torque transmitting means;

(i) film winding operation hindering means having a detent member engageable with said film winding means and said shutter rear curtain movement detecting means, whereby when said shutter is cocked, said detent member engages with said film winding means to hinder film winding operation and when said shutter rear curtain movement detecting means produces said detection signal, said winding torque force transmitting means is released from said detent member;

(j) clutch means arranged between said spool shaft and said winding up torque transmitting means upon operation from the outside of the camera to release said spool shaft from operative connection with said transmitting means;

(k) film rewinding means having an operating member operable after said spool shaft is taken out of connection with said clutch means;

(l) film rewinding operation hindering means having a detent member movable in engagement with said mirror actuating member to a position where said clutch means is effective when said mirror is in the non-viewing position and to a position wherein said clutch means is ineffective when said mirror is in the viewing position; and (m) film winding and rewinding detention release means having an operating member accessible from the outside of the camera for actuating said shutter rear curtain holding and releasing means to release said shutter rear curtain from the held position and arranged upon operation to actuate said shutter rear curtain movement detecting means so that said winding torque transmitting means is released from connection with said detent member by said detection signal, thereby film winding operation is made possible, and said mirror actuating means is caused by said mirror return control means to return to the viewing position where said film rewinding operation hindering member can be moved from engagement with said clutch means, thereby making possible the film rewinding operation.

20. A camera according to claim 19, wherein said shutter rear curtain holding and releasing means form an actuating signal, and further including a warning means having:

(i) a logic circuit receptive of the output signal of said shutter time control means and the actuating signal of said shutter rear curtain holding and releasing means for detecting the opening and closing states of said shutter; and (ii) light-emitting means responsive to the output signal of said logic circuit for providing light-emitting display according to the opening and closing states of the shutter.

21. A device as in claim 20, wherein said rear curtain holding and actuating means includes a switch responsive to said electromagnetic device and coupled to the logic circuit, said switch forming the actuating signal.

22. A safety device for a camera comprising:
(a) a camera body having a shutter having a front curtain and a rear curtain controlling an amount of film exposure and having a mirror movable between a viewing position and a non-viewing position;
(b) shutter time control means for producing a shutter rear curtain closing signal to control the time of closure of the shutter based on set and computed shutter times;
(c) release means responsive to photo-taking operation of the camera for performing a releasing operation;
(d) mirror actuating means responsive to said releasing operation of said release means for moving said mirror from said viewing to said non-viewing position and having bias means for returning said mirror from said non-viewing to said viewing position;
(e) shutter rear curtain holding and releasing means having an electromagnetic element whose energization is controlled by said shutter rear curtain closing signal, whereby said shutter rear curtain is held and released in response to attracting and releasing operation of said electromagnetic element;
(f) shutter rear curtain movement detecting means for detecting if said shutter rear curtain runs down to produce a detection signal;
(g) mirror return control means responsive to said detection signal for returning said mirror actuating means and said mirror to the viewing position;
(h) film winding means having an operating member accessible from the outside of the camera, having torque transmitting means for transmitting torque of said operating member and having a spool shaft which is rotated in connection with said torque transmitting means;
(i) film winding operation hindering means having a detent member engageable with said film winding means and said shutter rear curtain movement detecting means, said hindering means being arranged so that when said shutter is cocked, said detent member engages with said film winding means to hinder film winding operation and when said shutter rear curtain movement detecting means produces said detection signal, said winding torque force transmitting means is released from said detent member;
(j) clutch means arranged between said spool shaft and said winding torque transmitting means upon operation from the outside of the camera to release said spool shaft from operative connection with said transmitting means;
(k) film rewinding means having an operating member operable after said spool shaft is taken out of connection with said clutch means;
(l) film rewinding operation hindering means having a detent member movable in engagement with said mirror actuating member to a position where said clutch means is effective when said mirror is in the non-viewing position and to a position where said clutch means is ineffective when said mirror is in the viewing position; and
(m) film winding and rewinding detention release means having an operating member for disengaging said spool shaft from said clutch means with simultaneous occurrence of actuation of said shutter rear curtain holding and releasing means for releasing said shutter rear curtain from the held position, operation of said operating member causing actuation of said shutter rear curtain movement detecting means to produce said detection signal by which said film winding detention member is taken out of connection with said winding rotation force transmitting means to enable the operator to perform winding operation, and operation of said mirror return control means causing return movement of said mirror actuating means to the mirror viewing position where said film rewinding detention member is moved away from said clutch means to enable the operator to perform rewinding operation.

23. A safety device for a camera according to claim 22, wherein said shutter rear curtain holding and releasing means form an actuating signal, and further including:
(a) warning means having:
 (i) a logic circuit receptive of the output signal of said shutter time control means and the actuating signal of said shutter rear curtain holding and releasing means for detecting the opening and closing states of said shutter; and
 (ii) light-emitting means responsive to the output of said logic circuit for providing light-emitting display according to the opening and closing states of said shutter.

24. A device as in claim 23, wherein said rear curtain holding and actuating means includes a switch responsive to said electromagnetic device and coupled to the logic circuit, said switch forming the actuating signal.

25. A safety device for a camera to which an automatic winding device is attachable, said winding device having;
(a) drive torque generating means and drive torque transmitting means for transmitting drive torque to a camera body in an intermittent manner based on a signal from either of said camera body and said winding device; and said camera comprising:
(A) said camera body having a shutter having a front curtain and a rear curtain controlling an amount of exposure of a film and having a mirror movable between a viewing position and a non-viewing position;
(B) shutter time control means for producing a shutter rear curtain closing signal to control the time of closure of the shutter based on set and computed shutter times;
(C) release means responsive to photo-taking operation of the camera for performing releasing operation;
(D) mirror actuating means responsive to said releasing operation of said release means for moving said mirror from said viewing to said non-viewing position and having bias means for returning said mirror from said non-viewing to said viewing position;
(E) shutter rear curtain holding and releasing means having an electromagnetic element whose energization is controlled by said shutter rear curtain closing signal, whereby said shutter rear curtain is held and released in response to attractive and releasing operation of said electromagnetic element;

(F) shutter rear curtain movement detecting means for detecting if said shutter rear curtain runs down to produce a detection signal;

(G) mirror return control means responsive to said detection signal for returning said mirror actuating means and said mirror to the viewing position;

(H) film winding means having coupling means connected to said drive torque transmitting means of said automatic winding device, a spool shaft for winding said film and rotation force transmitting means for transmitting means for transmitting drive force from said coupling means to said spool shaft;

(I) film winding operation hindering means having a detent member engageable with said film winding means and said shutter rear curtain movement detecting means, whereby when said shutter is cocked, said detent member engages said film winding means to hinder film winding operation and when said shutter rear curtain movement detecting means produces said detection signal, said winding torque force transmitting means is released from said detent member;

(J) clutch means arranged between said spool shaft and said winding torque transmitting means upon operation from the outside of the camera to release said spool shaft from operative connection with said transmitting means;

(K) film rewinding means having an operating member operable after said spool shaft is taken out of connection with said clutch means;

(L) film rewinding operation hindering means having a detent member movable in engagement with said mirror actuating member to a position where said clutch means is effective when said mirror is in the non-viewing position and to a position where said clutch means is ineffective when said mirror is in the viewing position;

(M) damage detecting means having switch means of which the opening and closing operation is controlled in response to operation of said shutter rear curtain holding and releasing means and logic means receptive of the output of said shutter time control means for performing logic control, so that malfunctioning of said shutter rear curtain is detected;

(N) drive force stopping means receptive of the output signal of said logic means for stopping operation of said drive force generating means of said automatic winding device to stop transmission of the drive force;

(O) film winding and rewinding detention release means having an operating member accessible from the outside of the camera for actuating said shutter rear curtain holding and releasing means to release said shutter rear curtain from the held position and arranged upon operation to actuate said shutter rear curtain movement detecting means so that said winding torque transmitting means is released from connection with said detent member by said detection signal, and said mirror actuating means is caused by said mirror return control means to return to the viewing position where said film rewinding operation hindering member can be moved from engagement with said clutch means so that said film rewinding operation is enabled; and (P) warning means having light-emitting means connected to said logic means of said damage detecting means so that energization of said light-emitting means is controlled by the output signal of said logic means to warm that said shutter is left open.

26. A safety device for a camera according to claim 25, wherein said film winding and rewinding detention release means has an operating member responsive to disengagement of said spool shaft from said clutch means for actuating said shutter rear curtain holding and releasing means to release said shutter rear curtain from the held position, whereby operation of said operating member causes actuation of said shutter rear curtain movement detecting means to produce said detection signal by which said film winding detention member is taken out of connection with said winding rotation force transmitting means to enable the winding operation to be performed and whereby operation of said mirror return control means causes return movement of said mirror actuating means to the mirror viewing position where said film rewinding detention member is moved away from said clutch means to permit the rewinding operation to be accomplished.

* * * * *